No. 796,335. PATENTED AUG. 1, 1905.
A. M. JOHNSTON.
GUIDE ATTACHMENT TO ROLLING MILLS.
APPLICATION FILED OCT. 1, 1904.
2 SHEETS—SHEET 2.
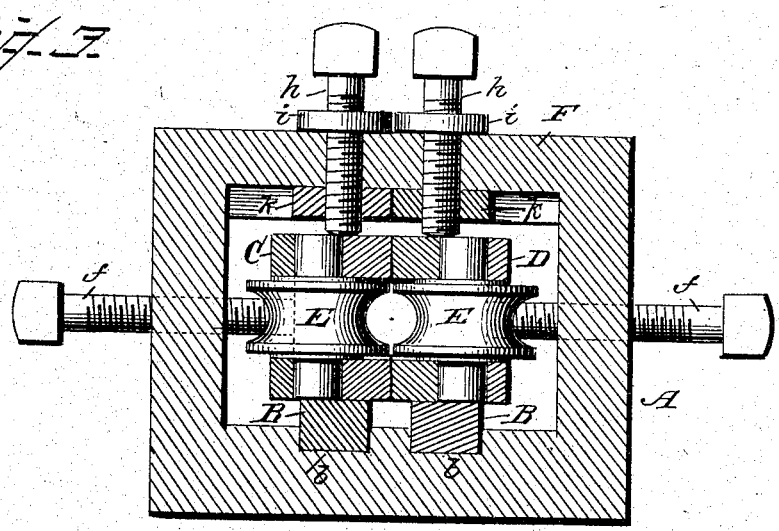
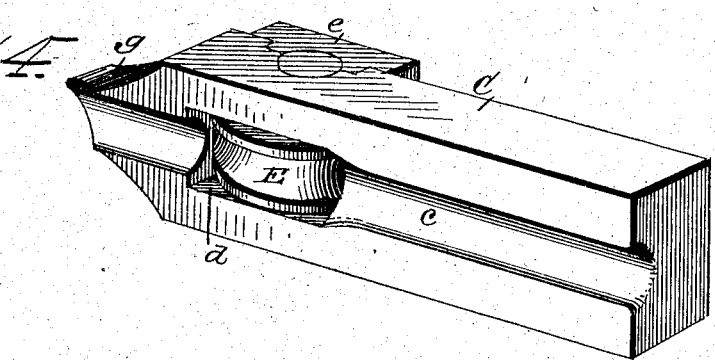
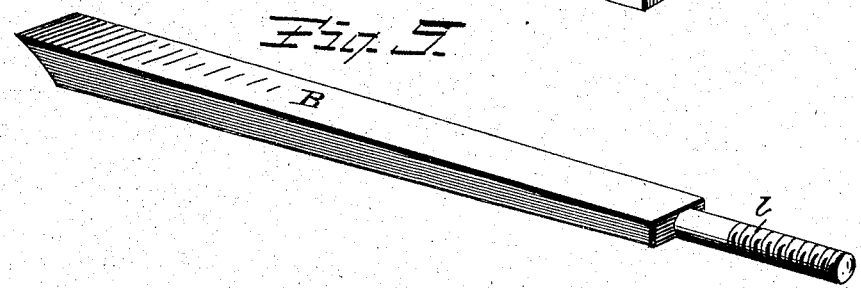
WITNESSES
INVENTOR
Alexander M. Johnston,
per Chas. H. Fowler
Attorney

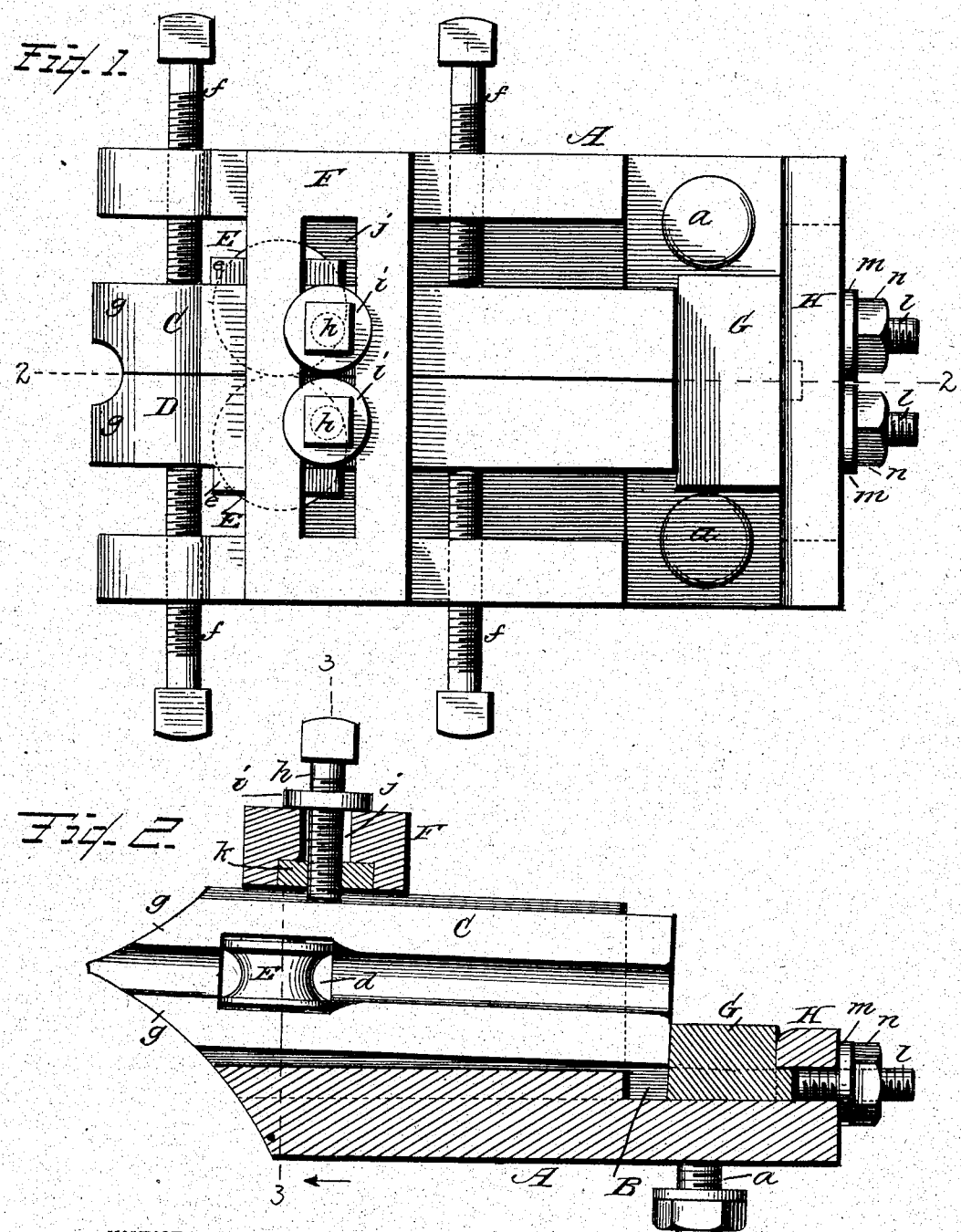

UNITED STATES PATENT OFFICE.

ALEXANDER M. JOHNSTON, OF CRAFTON, PENNSYLVANIA.

GUIDE ATTACHMENT TO ROLLING-MILLS.

No. 796,335. Specification of Letters Patent. Patented Aug. 1, 1905.

Application filed October 1, 1904. Serial No. 226,779.

*To all whom it may concern:*

Be it known that I, ALEXANDER M. JOHNSTON, a citizen of the United States, residing at Crafton, in the county of Allegheny and State of Pennsylvania, have invented certain new and useful Improvements in Guide Attachments to Rolling-Mills; and I do hereby declare that the following is a full, clear, and exact description of the same, reference being had to the annexed drawings, making a part of this specification, and to the letters of reference marked thereon.

The present invention has for its object to provide a guide attachment for that class of rolling-mills in which the metal bar or rod passes between suitable rolls and in which all imperfections are removed from the rod, producing a smooth surface and a perfect rod through the use of the attachment.

The invention consists in a guide attachment for rolling-mills constructed substantially as shown in the drawings and hereinafter described and claimed.

Figure 1 is a top plan view of the guide attachment constructed in accordance with my invention; Fig. 2, a longitudinal section taken on line 2 2 of Fig. 1; Fig. 3, a transverse section taken on line 3 3 of Fig. 2 looking in the direction of the arrow, the grooved rolls and set-screws being shown in elevation. Fig. 4 is a perspective view of one of the guide-sections; Fig. 5, a similar view of one of the wedges for adjusting the height of the guide.

In the accompanying drawings, A represents the guide-box, which may be of any suitable size and construction, which is provided with suitable clamping-screws $a$ or any other preferred means that will securely hold the box down upon a support or other stationary object. The box A is formed with guide-grooves $b$ to receive the wedge-shaped adjusters B. (Shown in detail in Fig. 5 of the drawings and which will be hereinafter more fully described.)

The guide for the rod is formed in two longitudinal separable sections C D, having each a semicircular groove $c$ upon its inner side, and has a socket $d$, in which is located a grooved roller E, held therein by a suitable box $e$ or by any other preferred means. The sections C D are adjustably held together within the box by suitable set-screws $f$, preferably four in number, although any number of set-screws may be used, as found most desirable, the grooved faces of the sections being opposite each other, as shown in Fig. 3 of the drawings. The guide-sections C D at their forward ends are reduced in shape to correspond with the shape of space between the meeting peripheries of the rolls of the mill, as shown at $g$, so that the reduced ends of the sections will enter between the rolls nearly to the point where the rolls take the metal.

Through the medium of the set-screws $f$ the two separable guide-sections C D may be adjusted laterally and held in their adjusted position, the set-screws $h$ extending down through the top of the box A, holding the guide-sections firmly in place after being adjusted laterally. The set-screws $h$ have washers $i$, and said screws extend down through a frame F, having an elongated slot $j$ to allow the set-screws to be moved laterally to adapt them to the position of the guide-sections C D when moved laterally, and upon the ends of the set-screws are nuts $k$.

In describing the set-screws $f$ and $h$ I do not desire to be understood as limiting my invention to the particular means shown for adjusting and holding in adjustment the guide-section, as any suitable means may be substituted as found most practical.

A block G, preferably of steel, is employed and placed between the heels of the guide-sections and the slotted cleat H to prevent the guide-sections from slipping back out of position.

The wedge-shaped adjusters B, as shown in Fig. 5 of the drawings, have a screw-threaded shank $l$ to receive a washer $m$ and screw-nut $n$, said shank extending through the slotted cleat H, this means being preferably employed for moving the wedge-shaped adjusters in or out to regulate the height of the guide-sections C D, which rest thereon.

It is evident that any suitable and well-known means may be employed for controlling the movement of the wedge-shaped adjusters, and many changes or modifications may be resorted to in the general construction of the attachment without departing from the essential features of the invention.

Having now fully described my invention, what I claim as new, and desire to secure by Letters Patent, is—

A guide attachment for rolling-mills, comprising a box or frame and a guide adjustably held therein, said guide comprising two separable longitudinally-grooved sections each having a grooved roller in which the groove is on line with the groove in the section, a frame above the guide with a transverse slot and set-screws extending through the slot and adapted to bear against the guide-sections, said slotted frame enabling the screws to be moved transversely therein, and a slidable wedge-shaped adjuster for regulating the height of the guide, substantially as and for the purpose set forth.

In testimony whereof I affix my signature in presence of two witnesses.

ALEXANDER M. JOHNSTON.

Witnesses:
JOHN BOURKE,
WM. MCMURRAY.